April 15, 1930. J. J. JAKOSKY 1,754,627
APPARATUS FOR THE PREVENTION OF HIGH FREQUENCY RADIATION
Filed Dec. 30, 1925 2 Sheets-Sheet 2
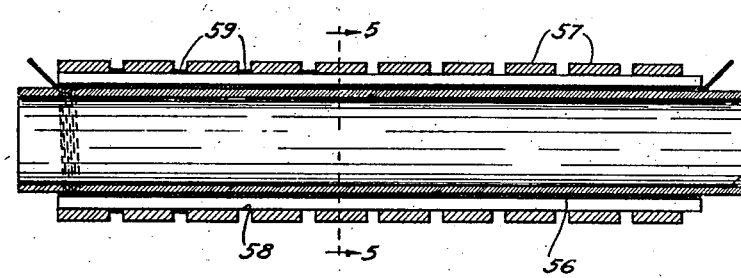
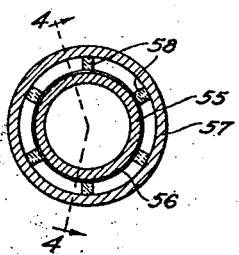
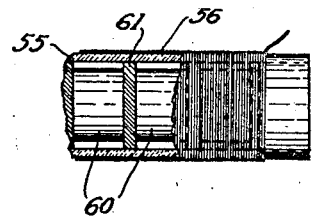
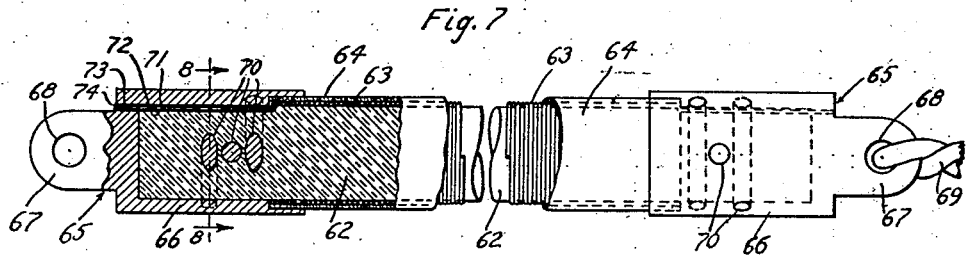
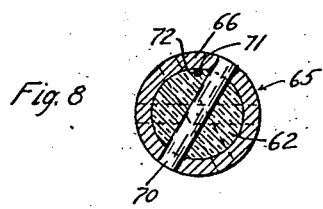
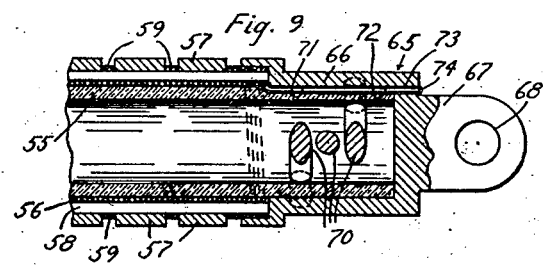
INVENTOR
John J. Jakosky
BY Arthur P. Knight
ATTORNEY

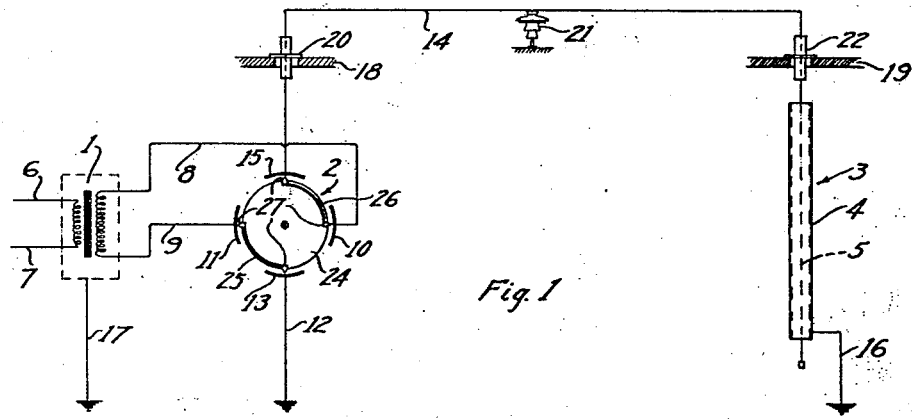
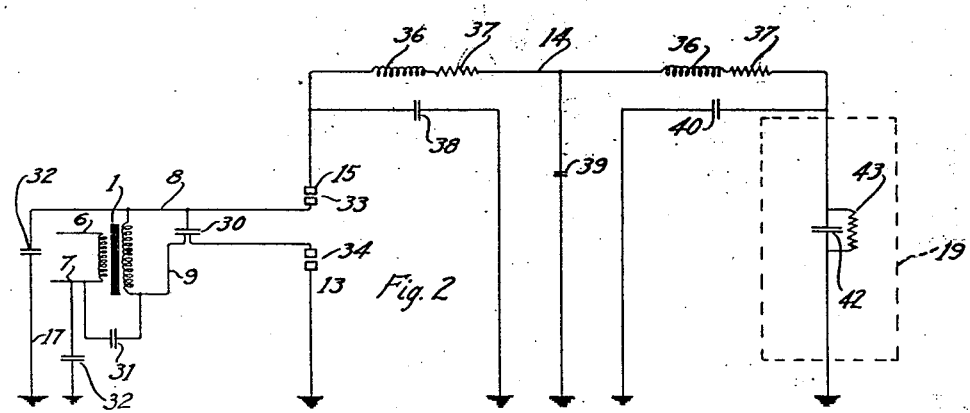
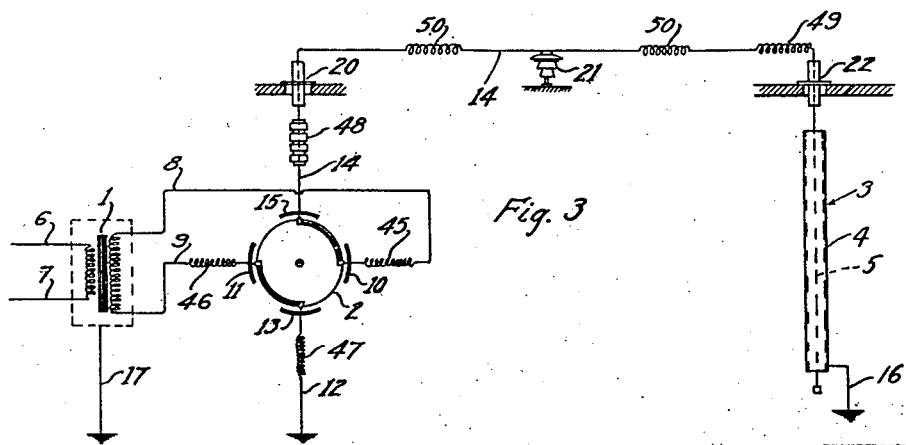

Patented Apr. 15, 1930

1,754,627

UNITED STATES PATENT OFFICE

JOHN J. JAKOSKY, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA

APPARATUS FOR THE PREVENTION OF HIGH-FREQUENCY RADIATION

Application filed December 30, 1925. Serial No. 78,472.

This invention relates to the prevention of radio interference caused by electromagnetic radiation of high frequency oscillations in complex electrical circuits which include means tending to produce such oscillations.

The main object of the invention is to effectively and positively prevent such high frequency radiation from the elements of the circuit together with the objectionable radio interference ordinarily caused by such radiation. It is an important object of the invention to eliminate all radio interference now caused by the operation of circuits of this nature, whether the interference be caused by propagation of high frequency waves through space in the ordinary manner of radio transmission, or by transmission along connected or adjacent metallic conductors, such as transmission lines, in the manner known as line-radio, wired-wireless, or carrier-currents.

My invention is particularly applicable in connection with the operating circuits of electrical precipitation installations or other electrical circuits in which the current flows in a pulsating or non-continuous manner with a steep wave front, for example in the electrical circuits of X-ray apparatus, automatic bell-ringers, sign flashers, etc. In such circuits high frequency line interference or oscillations may be generated and the resulting high frequency currents may be radiated as electromagnetic waves or transmitted along nearby transmission lines and cause serious interference in radio reception, the extent of the interference depending upon the frequency and magnitude of the high frequency currents and the extent to which these currents may be radiated into space or be carried by line-radio to radio receiving sets. Furthermore in a circuit of this nature there is generally more or less sparking, for example at the spark gaps included in the circuit of an electrical precipitator as hereinafter described, and the resulting interrupted current flow results in the setting up in the circuit of oscillations of extremely high frequency. This is particularly true of circuits containing appreciable values of inductance and capacity, since such circuits have certain natural periods of oscillation.

The operating circuit of an electrical precipitator installation presents considerable values of inductance and capacity, and the current flow is not only discontinuous, since in general it consists of the intermittent peak portions of rectified alternating current waves, but also presents pulsations of much greater frequency due to the sparking at the spark gaps of the mechanical rectifier which is ordinarily employed in such circuits. This combination results in the creation of many high frequency line transients of different frequency ranging from the lower harmonics of the alternating current supplied to the rectifier to the very high frequencies caused by the oscillatory nature of the spark discharge across the rectifier terminals. The radiation or line transmission of these high frequency oscillations has often resulted in the past in very serious interference with radio reception and it is the main object of this invention to do away with this interference.

The term "complex circuits" is used herein to designate circuits which include a plurality of branches each of which is capable of sustaining high frequency oscillations and it is a particular object of this invention to prevent high frequency oscillations in all such branches which contain parts or elements from which such oscillations might be radiated.

I have also developed a particularly advantageous type of inductance or reactance coil such as described hereinafter, for use in the prevention of high frequency oscillations in accordance with this invention, but the construction of such coil is not claimed specifically herein but is covered in a divisional application filed by me on April 26, 1927, Serial No. 186,630.

According to my invention, the radiation of high frequency waves from the effective radiating members of a complex circuit of the type above described is prevented by placing, in each branch of such circuit which contains an effective radiating member and in which high frequency oscillations tend to occur, a sufficient value of substantially non-capacitive high frequency impedance (either in the form of inductance or resistance or both) to effectively prevent the occurrence of high frequency oscillations in that branch and thereby prevent radiation from the effective radiating member thereof. The invention also comprises a particular type of absorber coil for inserting in the circuit for the above purpose.

Since the invention is particularly applicable in connection with electrical precipitator installations I will illustrate and describe it in connection therewith, the accompanying drawings illustrating its application to such an installation. Referring to these drawings:

Fig. 1 is a diagrammatic representation of the operating circuit of an electrical precipitator installation.

Fig. 2 is a diagrammatic representation of the equivalent electrical characteristics of such circuit.

Fig. 3 is a diagram similar to Fig. 1 showing the application to such a circuit of means for preventing high frequency oscillations therein according to my invention.

Fig. 4 is a longitudinal section on line 4—4 in Fig. 5, showing an absorber coil particularly adapted for use in connection with this invention.

Fig. 5 is a transverse section on line 5—5 in Fig. 4.

Fig. 6 is a partly sectional side elevation of a modified form of absorber coil.

Fig. 7 is a partly sectional elevation of a type of inductance means particularly adapted for connection in a conducting line so as to support and transmit the strain therein.

Fig. 8 is a transverse section on line 8—8 in Fig. 7.

Fig. 9 is a partial longitudinal section of another type of inductance or choke means for connection in a conducting line.

The electrical precipitation apparatus shown in Fig. 1 comprises essentially a high voltage step up transformer 1, a synchronous double-wave spark gap rectifier 2, adapted to be driven in synchronism with the alternating current to be rectified, and an electrical precipitator 3 including collecting electrode means consisting for example of pipe or tube 4 and discharge electrode means opposing said collecting electrode means and consisting for example of wire or fine rod 5 suspended centrally within said pipe or tube. While I have shown the precipitator as comprising only a single pair of electrodes, it will of course be understood that in practice it includes a plurality of discharge and collecting electrodes connected in parallel. The electrical circuit includes power supply wires 6 and 7 leading from any suitable source of alternating current of relatively low voltage and connected to the primary winding of transformer 1, wires 8 and 9 leading from the secondary winding of said transformer to the opposite fixed contacts 10 and 11 respectively of the mechanical rectifier 2, wire 12 leading from rectifier contact 13 to ground, wire 14 leading from rectifier contact 15 to the discharge electrode means 5 of the precipitator, and wire 16 connecting the collecting electrode means 4 to ground. A ground connection 17 is also generally provided for the casing of transformer 1. Suitable insulating supports 20, 21, and 22 may be provided for the line 14 leading from the rectifier to the precipitator, insulator 20 being for example located at the point where the line 14 passes through wall 18 of the housing or building containing the high frequency apparatus, insulator 21 being for example an intermediate support for said line, and insulator 22 being for example located at the point where said line enters the precipitator housing indicated at 19.

Rectifier 2 may be of any suitable type and may comprise for example a rotatably mounted disk 24 of suitable insulating material and provided with opposing contact segments 25 and 26 having contact members 27 adapted to make contact in the rotation of the rectifier disk with fixed contacts 10, 11, 13, and 15. The rectifier disk may be driven for example by connection to a synchronous motor operated in synchronism with the current supplied to transformer 1.

In the operation of such an apparatus the relatively low voltage current supplied to transformer 1 is stepped up to the desired voltage say from 15,000 to 100,000 volts, and the rectifier 2, by alternately establishing connection between the respective fixed contact members 10, 11, and 13, 15, in synchronism with such current, rectifies such current and supplies it to the electrical precipitator in the form of discontinuous unidirectional current of the same frequency as that of the alternating current supplied to the rectifier. When the rectifier is in the position shown in Fig. 1 the electrical precipitator circuit is at that instant as follows: from the secondary winding of the transformer 1 through wire 8, contacts 10, 26, and 15, wire 14, discharge electrode 5, collecting electrode 4, wire 16, ground, wire 12, contact members 13, 25, and 11, and wire 9, back to the transformer. During the next half wave the circuit is substantially the same with the exception that the connections at the rectifier contacts are reversed so as to provide for continually maintaining the discharge electrode 5 at the same potential, that is either negative or positive, and preferably at a negative potential. The resulting high voltage drop between discharge electrode means 5 and collecting electrode means 4 causes a silent or corona discharge to be set up within the collecting electrode which results as is well-known in the precipitation of suspended matter contained in the gas passed therethrough. Since the precipitation of the suspended matter and the manner of passing the gas through the apparatus form no essential part of this invention, no particular means are shown for supplying the gas or for removing the precipitated material.

The pulse in the precipitator circuit is not of the "square" or simple type wherein the voltage rises suddenly, holds this value for a given period of time, and then drops suddenly. The effects of such a pulse can often be calculated, knowing the constants of the circuit. The actual precipitator current consists of a series of irregularly timed impulses caused by the sparking at the rectifier contacts and the leakage in the treater tubes. Irregular currents of this type produce oscillatory currents possessing characteristic beats of irregular time frequency, thereby producing the "frying" or constant hissing as received by radio sets. Under proper circuit conditions the oscillatory current will exist in a series of trains or groups of the same frequency as the primary pulse. The radiated wave of such an oscillatory current, when picked up by a radio set, gives a sound of the frequency of that of the pulse. A 60 cycle pulse would, therefore, produce a 60 cycle "frying" sound in the radio set.

Under practical operating conditions, however, the sparking at the rectifier and the varying load in the precipitator tube causes a very irregular current flow. Under such conditions the transient current is of irregular amplitude and frequency and has no regular trains or groups of oscillations. Such a current gives a frying or buzzing sound, which is characteristic of the precipitator and any other circuit in which the resistance is not of too high a value and where sparking occurs.

The electrical characteristics of the above described electrical precipitator circuit are indicated in Fig. 2. Various capacities exist in the transformer due to bushings, windings, etc., such capacities being indicated at 30 between wires 8 and 9, at 31 between the primary and secondary windings of the transformer and at 32 between the transformer windings and ground. The rectifier may be represented as two spark gaps 33 and 34 between which exists the capacity 30 above mentioned. As a matter of fact each spark gap 33 and 34 comprises two spark gaps in series, one between the contacts 15 or 13 and the particular contact member 27 which is then in sparking relation thereto and the other between the contact 27 at the opposite end of the respective contact segment 25 or 26 and the opposing fixed contact 10 or 11. For the sake of simplicity however and since the electrical characteristics are sufficiently clearly indicated thereby each of these double spark gaps is shown as a single spark gap. The line 14 contains inherent inductance indicated at 36 and resistance indicated at 37 and various capacities to ground as indicated at 38, 39, and 40 due to the insulating supports 20, 21, and 22 respectively. The electrical precipitator may be represented as a capacity 42 between the discharge and collecting electrodes, said capacity being shunted by a resistance 43 due to the current leakage caused by ionization of the gas.

This circuit is then a typical oscillatory circuit whose constants differ with each individual installation. It should be noted that very little of the transformer inductance is actually included in the circuit of high frequency oscillations due to the many capacities which readily permit such high frequency currents to by-pass the transformer windings. It will also be seen that the precipitator circuit is not a simple series circuit containing lumped inductance, capacity, and resistance but that these effects are distributed at various points throughout the circuit and in various branches thereof. Such a circuit will not follow the formula which govern simple series circuits containing lumped values of inductance, capacities and resistances. Attempts have heretofore been made using simple series circuit formulæ to determine a certain value of resistance, inductance, or capacity which might be included at one point in the precipitator circuit to prevent high frequency oscillations. Calculations made on this basis do not hold true for circuits of this nature however, the extent of the deviation depending upon the extent to which the complex circuit differs from the simple series circuit.

As an example the theoretical resistance may readily be calculated which will stop all high frequency oscillations in a simple series circuit and the insertion of such resistance in such a circuit will stop the oscillations. On the other hand the insertion of such a resistance in a complex circuit may have very little effect. It will no doubt stop oscillations in that branch of the circuit in which the resistance is located but the remaining parallel paths or branches may allow sufficient high frequency current to flow so that the resultant effect on the entire circuit may be scarcely noticeable.

It is therefore necessary in dealing with a complex circuit presenting a plurality of electrical paths not only to have the required values of resistance, inductance, or capacity. but also to have such values placed at different points so as to effectively prevent oscillation in all branches. My invention consists essentially in the intelligent placing of substantially non-capacitive impedance devices, consisting of resistances or inductances or both, in the various effective radiating branches of a complex capacity circuit, each of said resistances or inductances being of such value as to prevent the passage of high frequency currents in that branch and thus entirely eliminate the radiation of high frequency waves from all effective radiating members of the circuit.

One of the easiest ways of stopping oscillations in a precipitator circuit is by adding resistances in the various branches thereof. For a simple series circuit, the resistance required to prevent oscillations may be calculated knowing the constants of the circuit. The natural frequency of any series circuit may be expressed by the general formula:

$$(1) \quad f = \frac{1}{2\pi}\sqrt{\frac{1}{LC} - \frac{R^2}{4L^2}}$$

In cases where $\frac{R^2}{4L^2}$ is equal to or greater than $\frac{1}{LC}$ then free oscillations in the circuit are impossible. Such circuit is said to be "aperiodic"—it will not allow free oscillations and has no free period of its own. Mathematically this may be expressed as follows:

$$(2) \quad \frac{R^2}{4L^2} \geq \frac{1}{LC}$$

$$(3) \quad R^2 \geq \frac{4L^2}{LC} = \frac{4L}{C}$$

$$(4) \quad R \geq 2\sqrt{\frac{L}{C}}$$

Therefore when the resistance of the circuit is equal to, or greater than, twice the square root of L/C, the circuit will not oscillate.

The effective resistance of a circuit or conductor varies with the frequency. In an oscillatory circuit the following factors determine the effective resistance, (1) ohmic resistance of the conductor itself, (2) skin effect and diameter of conductor, (3) resistance of neighboring closed circuits and their proximity, (4) permeability and magnetic material near conductors carrying high frequencies, (5) dielectric and hysteresis losses, (6) corona losses, (7) radiated energy, which causes the radio interference. The combined magnitudes and effects of the above govern largely the oscillatory currents flowing in a circuit of given values of inductance and capacity.

The ohmic or direct current resistance of the precipitator circuit is usually relatively low. The skin effect on such conductors may greatly increase the high frequency resistance, depending upon the general distribution of current in the conductor (dependent upon nearby conductors and diameter). The resistance of neighboring closed circuits is of considerable importance. If the high tension lines are closely coupled to closed circuits (such as closed railings, wire nettings, etc.) the effective resistance will be increased. The effects of magnetic materials, such as conduits, etc., are not usually of great importance. Dielectric losses may be quite high, mainly occurring in the treaters where considerable insulation is used to support the high tension discharge members.

In any given installation, the addition of capacity will be favorable for an increase in magnitude of the transients. Capacity need not be added in the form of high voltage condensers, but may be added unintentionally when connecting additional electrical precipitator units to the circuit, or by additional line or insulation capacities. Increasing the electrical capacity of an electrical precipitator installation may decrease the frequency (increase wave length) due to the higher oscillation constant. The decrease however, will not be as great as would be predicated by simple series circuit formulæ, due to the complex nature of the equivalent precipitator circuit.

The addition of precipitator units to an installation is a special case whereby additional capacity is added to the system, at the same time decreasing the circuit resistance. For any given installation the addition of precipitation units will be favorable for an increase in magnitude of the radio-frequency currents. This may be predicted mathematically from Equation (4) above given, from which it is seen that if R is equal to or greater than $2\sqrt{\frac{L}{C}}$ free oscillations are impossible. The magnitude of the oscillations increases with a decrease of R and with an increase in C. If each precipitator unit is considered as equivalent to a capacity shunted by a resistance then the greater the number of units in parallel in the circuit, the greater the total circuit capacity, C, and the lower the resistance, R, and hence the greater the amplitude of the oscillations.

The addition of inductances to a simple series circuit, produces similar results to the addition of capacity previously mentioned. The frequency of the oscillations is decreased (wave length increased). The equivalent circuit resistance to high frequency oscillations is increased, however, due to the high frequency resistance of any inductance coil. Due to the complex nature of the equivalent precipitator circuit as shown in Fig. 2 the addition of small amounts of inductance may not cause appreciable change in frequency. In such cases large values of inductance may be used in different paths of the high frequency circuit to act purely as radio frequency chokes because of their high reactance at the higher frequencies.

According to my invention, therefore, I prefer to place inductances or choke coils in the several branches of the precipitator circuit which are adapted to cause radiation, to prevent high frequency oscillations in all of such branches and thus stop radiation therefrom. By branches "which are adapted to cause radiation" I mean branches which contain effective radiating parts or elements, that is, elements which are exposed or unshielded so as to permit radiation therefrom. It will be noted that the discharge electrodes themselves are shielded by the grounded collecting electrodes and furthermore that all parts of the precipitator itself are shielded or enclosed by the precipitator housing, indicated at 19 in Fig. 2, so that such parts contain no effective radiating elements, and I find that, for the prevention of radio interference, the high frequency oscillations in the branches of the circuit lying within the precipitator housing may be disregarded.

As shown in Fig. 3 the choke coils may be placed, for example, at 45 and 46 in the leads 8 and 9, respectively, between the transformer and the rectifier; at 47 in the ground connection 12; at 48 in the high tension transmission line 14 and preferably adjacent the rectifier contact 15; and at 49 adjacent the insulating support at the point where line 14 enters the precipitator housing. Choke coils may also be placed, if desired, at intermediate points in the high tension line 14 as indicated at 50, and in general I find it advantageous to provide one of said choke coils for every 75 feet, more or less, of conductor length. If the line from the rectifier to the precipitator is less than 75 feet in length, it may not be necessary to insert any intermediate choke coil 50 therein.

The above-mentioned inductances may be connected directly in the circuit in any suitable manner. Coils 45 and 46 should be mounted as near as possible to the rectifier terminals 10 and 11; coil 47 should be mounted as near the rectifier terminal 13 as is practicable, and although it is in a grounded lead it should be well insulated from ground except through the line 12; coil 48 may be mounted directly on or as near as possible to the rectifier terminal 15; while coil 49 should be located as close to the treater as possible, and coils 50 may be connected into the conducting lines at suitable points, for example near the middle of each 75 foot section thereof.

The various choke coils may be of any suitable construction and of any suitable values of inductance, that is, they should be capable of presenting sufficient impedance at high frequencies to prevent high frequency oscillations in the circuits or branches in which they are included. In order to obtain the maximum impedance at high frequency, a choke coil should embody two electrical features; first, sufficient inductance to offer a high reactance; and second, low distributed coil capacity. I prefer, therefore, to make the coils of low inter-coil capacity. Multilayer coils usually have a relative high capacity, while for practical purposes the lowest distributed capacity coils suitable for use in electrical precipitator circuits are single layer windings on suitable insulating tubing and I therefore prefer, in general, to use coils of this type. They may, for example, be of the simple air core type, consisting of the necessary number of turns of wire wound on a piece of phenolic condensation product or other insulating tubing.

In a certain installation I have found that choke coils 45, 46, 47, and 49 may advantageously have a value of 3000 microhenrys and may be made by winding approximately 500 turns of No. 26 D. C. C. wire on a 2⅝ inch diameter phenolic condensation product tube, while coils 50 may advantageously have an inductance of 1000 microhenrys and may be made by winding approximately 500 turns of similar wire on a 1½ inch diameter phenolic condensation product tube. The coils, after winding, should in either case be dipped in varnish and baked in the usual manner of preparing such coils.

Iron core choke coils may also be especially advantageous in certain cases, if properly made. The use of iron increases the inductance and also the effective resistance of the coil which is advantageous in producing absorption, rather than reflection, of the high frequency currents. The use of choke coils often causes high voltages to build up ahead of the choke, due to reflection phenomena and the high reactance of the choke. Such potentials, if super-imposed on the low frequency voltage of the precipitator circuit may cause disruptive peak voltages and thus impair the operation of the precipitator. It is therefore advantageous to use a choke which not only prevents the passage of high frequency current but also absorbs or dissipates part of the energy thereof. The use of a solid iron core choke not only increases the effective resistance, due to eddy current and hysteresis losses, but also causes the inductance to be increased to a much less extent than would be the case if a laminated core were used, due to the iron core acting to a certain extent as a short-circuited secondary winding for the choke coil (this latter effect may be enhanced by providing an external, rather than an internal, iron core). By this means, therefore, the absorption of energy due to the effective resistance of the choke (hysteresis and eddy losses) may readily be increased to the desired extent without introducing an excessive value of inductance.

In an ordinary solid iron core coil, however, a capacity exists between the coil and the core, and high frequency current may therefore flow across such capacity at the ends of the coil and hence through the iron core, thus greatly lowering the impedance of the coil at high frequencies. I have found, however, that this defect may be overcome by making the core of a plurality of short sections, each insulated from one another and each forming a complete short-circuited secondary. The high frequency currents passing by capacity to any section of the core are substantially prevented from passing along the core due to the interposition of the insulating layers which present high resistance and low capacity. Such a coil therefore presents maximum effective resistance so as to provide for the maximum absorption, rather than reflection, of high frequency currents, and also provides the necessary inductance to act as a choke and at the same time has a low distributed capacity. Furthermore a considerable amount of energy is absorbed from the high frequency oscillatory current due to the iron core sections acting as a short-circuited secondary coil. This coil may therefore be known as an "absorber coil".

One method of constructing such an absorber coil is shown in Figs. 4 and 5. The coil consists essentially of a tube 55 of phenolic condensation product or other insulating material around which are wound a sufficient number of turns of wire to form the coil itself, indicated at 56. The winding may be made to have any desired value of initial inductance. In one case, I have used for example a 2⅝ inch phenolic condensation product tube with a 500 turn winding consisting of No. 26 D. C. C. wire. A plurality of iron rings 57 are placed around the winding 56 and are spaced therefrom by means of strips 58 of phenolic condensation product or other insulating material. Rings 57 may be spaced apart in any suitable manner, for example by means of insulating material such as cord 59 wound around between such rings. The entire coil, after construction, should be dipped in varnish and baked.

The absorber may be considered as comprising a suitable primary winding, around which is placed a one-turn secondary coil, each of the iron rings extending completely around the coil for this purpose. The secondary coil, being made of iron, acts also to increase the magnetic flux, and is so constructed as to reduce the passage of high frequency currents due to internal capacity to the minimum value consistent with fairly close coupling.

The effective resistance of the absorber coil varies approximately with the square of the frequency. The higher transients therefore suffer much greater attenuation than the low frequency pulsating rectified current. As a result, the losses for the rectified current are reduced to minimum, while the losses for the undesirable high frequency transients are great. It can be shown that the high frequency resistance of the absorber coil may be many thousands of ohms, while the low frequency resistance for the rectified pulsating current is only a fraction of an ohm.

In any coupled circuit the apparent reactance of the primary is always changed by the presence of the secondary, and it may be further shown that the effective inductance of the primary is decreased by the current flowing in the secondary circuit. Considering the relationships existing between effective resistance and inductance in coupled circuits of this type, it is seen that the effect of the current flowing in the secondary is to increase the resistance of the primary circuit and to decrease its self-induction.

It may also be shown that these effects vary directly with the square of the frequency. The low frequencies suffer only slightly from the small change in effective resistance, while for the higher frequencies the effective resistance is greatly increased and the self inductance is greatly decreased. The increase in resistance and decrease in inductance tend to prevent oscillations as has already been shown.

As shown in Fig. 6 I may in some cases provide an internal, instead of an external, discontinuous core. The core may in this case comprise a plurality of short cylindrical pieces of iron 60, placed within the phenolic condensation product tubing 55 and spaced apart by layers 61 of phenolic condensation product or other insulating material. Such a construction is not, in general, as advantageous as that first described, however, due to poorer opportunity for radiation of heat and other reasons.

A particularly advantageous type of inductance means for connection at intermediate points in free conducting lines, for example as at 50 in the line 14, is shown in Figs. 7 and 8. Such an inductance means is constructed for direct connection in the line and is adapted to support and transmit the strain or stress existing in such a line due to the weight thereof between supports. Said inductance means may comprise suitable supporting means such as a core 62 of phenolic condensation product or other non-conducting and non-magnetic material, a wire coil or winding 63 of suitable wire around said core, and a protecting coating 64 of insulating material such as phenolic condensation product outside of said winding. The coil may further comprise two metallic connecting members 65, each of said members having a hollow cylindrical portion 66 fitting over one end of the phenolic condensation product core 62 and a projection or lug 67 provided with hole 68 for connection of the conducting line thereto as shown for example at 69. The end connection members 65 may be secured to the phenolic condensation product core by means of metallic pins 70 extending through holes in said connecting members and said core, said pins being of sufficient size and number to support the weight of the conducting line. The electrical connection between winding 63 and end members 65 may be provided by carrying each end of said winding, as indicated at 71, out through groove 72 in the core 62 and through hole 73 in end member 65 and soldering or otherwise securing the outer end of wire 71 to the end member as at 74. When a coil of this type is connected in a conducting line or between two conducting members, for example, when inserted as coil 50 between the portions of wire 14 at each side thereof, it forms mechanically an integral part of the line but interposes an electrical inductance of the desired value therein.

As shown in Fig. 9, the "absorber" type of coil shown in Fig. 4 may also be provided, if desired, with end connecting members for connection between two conducting members so as to support and transmit the stress or strain between such conducting members. Said coil may comprise, as before, core 55 of phenolic condensation product or other insulating material, an inductance coil 56 wound upon said core, longitudinal spacing strips 58, iron rings 57, and spacing means 59, such as phenolic condensation product rings, between said iron rings. End connecting member 65 is provided, having a hollow cylindrical portion 66 fitting over the end of core 55 and secured thereto, as before, by means of pins 70. The remainder of the construction is substantially the same as in Fig. 7.

Either of the coils shown in Fig. 7 and Fig. 9 may be used at any desired point in the circuit shown in Fig. 3, or in any other case where it is desired to insert an inductance or high frequency impedance directly in a free conducting line.

I have found that by interposing suitable values of high substantially non-capacitive frequency impedance. either in the form of resistance or inductances or both, at suitable points in the various capacity branches of an electrical precipitator, which contain effective radiating elements, for example, substantially as shown in Fig. 3, the high frequency radiations may be entirely prevented and radio interference thus eliminated. In the several actual instances which I have tried, electrical precipitator installations which had been radiating high frequency waves to such an extent as to render satisfactory radio reception in the surrounding neighborhood an absolute impossibility, were by the above-described means made absolutely non-radiating of such waves and the radio interference entirely suppressed so that radio reception was as satisfactory in the surrounding neighborhood when the precipitators were in operation as when they were shut off.

While the expression "substantially non-capacitive" is used herein to describe the high frequency impedance means inserted in the circuit, it is understood, of course, that such means will inevitably possess more or less capacitive reactance particularly at high frequencies. This expression is used, however, to indicate that at the frequency of the oscillations which it is desired to suppress the inductive reactance of the impedance means should be much greater than the capacitive reactance thereof, so that the resultant impedance may be resolved into a resistance and an inductive reactance.

I claim:

1. In combination with an electrical precipitation installation, mechanical rectifying means, an electrical circuit connected to said rectifying means for supplying alternating current thereto, an electrical circuit connected to said rectifying means and to said precipitation installation, said circuits including a plurality of capacity branches in connection with said rectifier and including portions providing effective radiating means, said rectifying means tending to produce high frequency oscillations in said circuits, means for preventing radiation of high frequency waves from said effective radiating means comprising a choke coil included in each of said circuit portions and presenting a sufficient high frequency impedance to effectively prevent high frequency oscillations therein.

2. In combination with an electrical precipitation installation, mechanical rectifying means, an electrical circuit connected to said rectifying means for supplying alternating current thereto, an electrical circuit connecting said rectifying means to said precipitation installation, said circuits having portions providing effective radiating means, said rectifying means tending to produce high frequency oscillations in said circuit and to cause high frequency radiation therefrom, means for preventing radiation of high frequency waves from said effective radiating means of the electrical circuit connecting rectifying means and the precipitation installation comprising a choke coil included in each of said electrical circuit portions between the rectifier and the precipitation installation.

3. In combination with electrical precipitation apparatus, mechanical rectifying means comprising a plurality of stationary contacts and a rotating contact means for establishing communication alternately between sets of stationary contacts, an electrical circuit for supplying alternating current and connected to certain of said stationary contacts, an electrical circuit connection connected to certain of said stationary contacts and to said precipitation apparatus, a ground connection for one of the stationary contacts of said mechanical rectifier and a choke coil in connection with each of the stationary contacts of said mechanical rectifier adapted to prevent radiation of high frequency oscillations in each of the connections of said rectifier.

In testimony whereof I have hereunto subscribed my name this 22nd day of December, 1925.

JOHN J. JAKOSKY.